Dec. 16, 1924.
M. B. FIELD
1,519,609
SPECIFIC GRAVITY METER
Filed Feb. 21, 1922
2 Sheets-Sheet 2
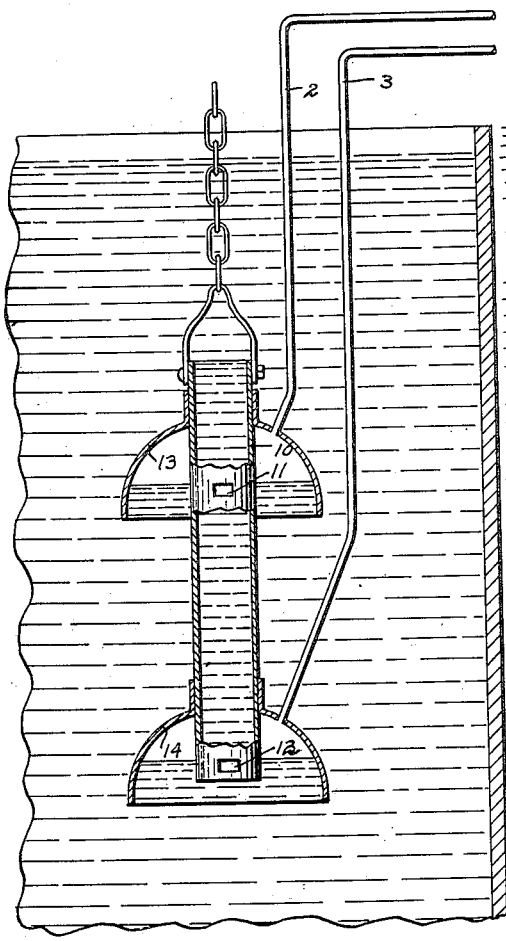
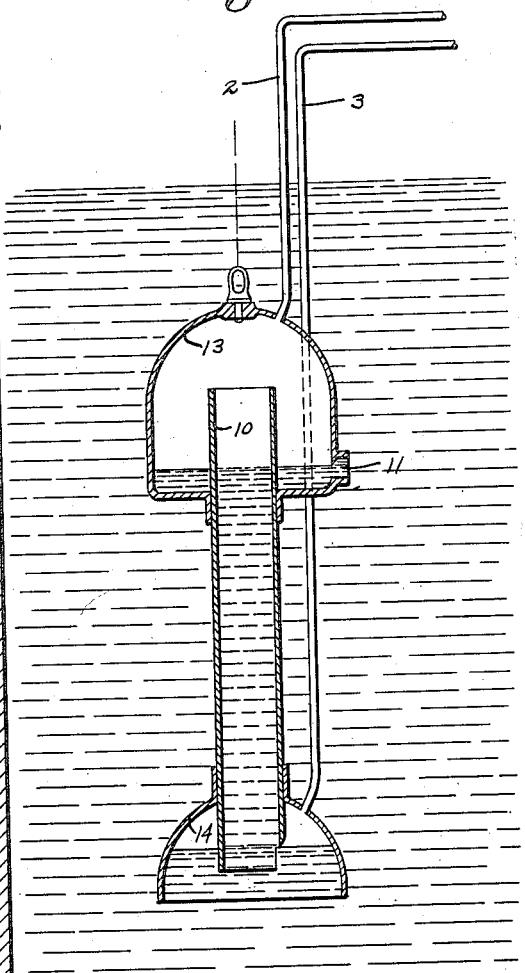
Inventor:
M. B. Field
by Wright, Brown, Quinby & Gray
Attys.

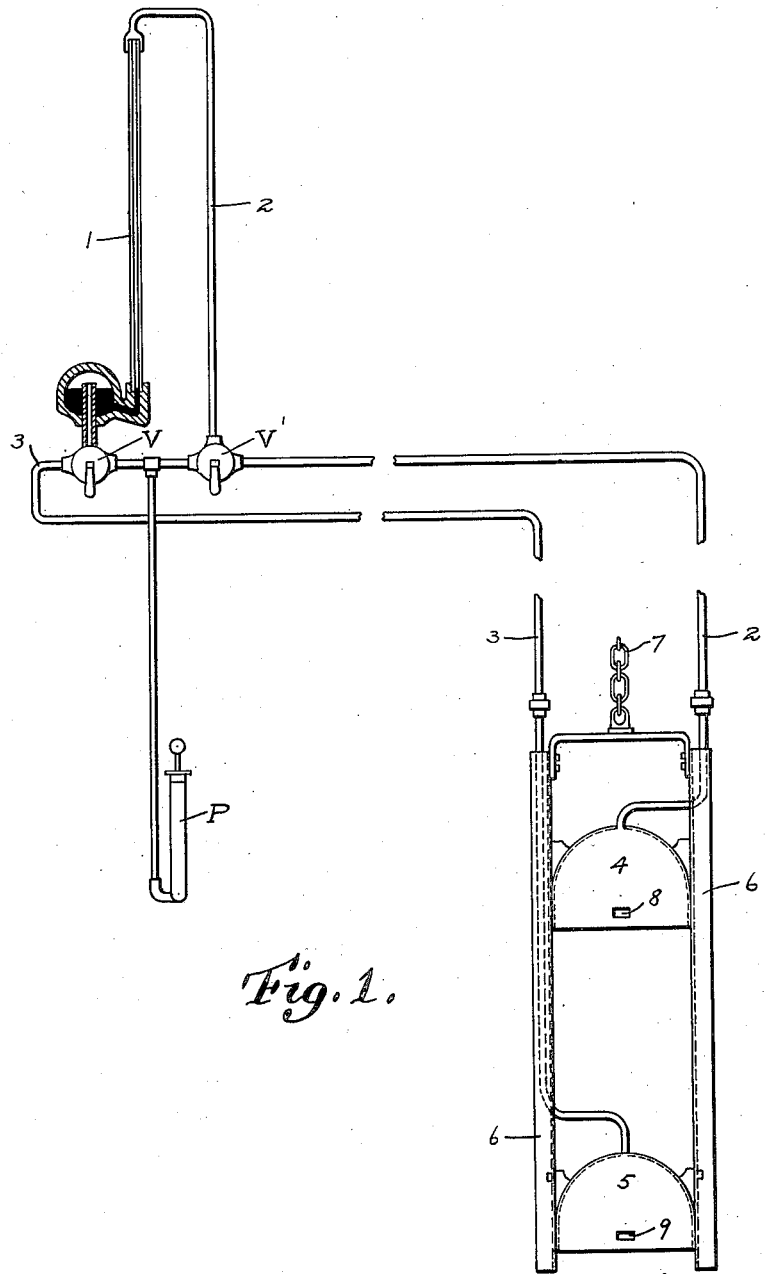

Patented Dec. 16, 1924.

1,519,609

UNITED STATES PATENT OFFICE.

MICHAEL BIRT FIELD, OF GLASGOW, SCOTLAND, ASSIGNOR TO PNEUMERCATOR COMPANY, OF NEW YORK, N. Y., A CORPORATION OF MAINE.

SPECIFIC-GRAVITY METER.

Application filed February 21, 1922. Serial No. 538,192.

*To all whom it may concern:*

Be it known that I, MICHAEL BIRT FIELD, a subject of the United Kingdom of Great Britain and Ireland, residing at Glasgow, Scotland, have invented new and useful Improvements in Specific-Gravity Meters, of which the following is a specification.

This invention relates to apparatus for indicating the specific gravity of liquid contained in a tank or other vessel, the apparatus being of that type which comprises two balance chambers located in the tank or vessel at a given vertical distance apart with connections to an indicating device the indication furnished by which is a function of the air pressures set up in the balance chambers.

According to the present invention there is provided a differential gauge having independent connections to the balance chambers, which gauge is calibrated to furnish a direct reading in terms of specific gravity.

Desirably both balance chambers are carried by a single rigid carrier immersed in the tank or vessel, which carrier may be a fixture or may be suitably suspended from a point above the tank or vessel.

The differential gauge may be of the form described in the specification of Letters Patent of the United States to Parks No. 1,131,412, March 9, 1915, and from its opposite ends pipe connections may be led to the balance chambers, or it may be in the form of a U-tube from the ends of which connections are led to the balance chambers.

Suitable valve-controlled connections may be provided for introducing air into the system, or the arrangement may be such as to avoid the necessity for introduction of additional air.

For the event that the carrier for the balance chambers is suspended to permit movement thereof the tubular connections to the differential gauge may be flexible or in part flexible.

Three embodiments of the invention are illustrated diagrammatically in elevation in the accompanying drawings.

Referring to Figure 1, 1 denotes the differential gauge from the opposite ends of which are taken tubular connections 2 and 3 to the upper and lower balance chambers 4 and 5, respectively, these balance chambers being mounted in a rigid carrier 6 suspended as by means of a chain 7 within a tank or other vessel. P represents an air pump typifying any means for introducing air into the system when such is required. V and V' are valves controlling the passage of air from the pump to the balance chambers and the transmission of pressure between the latter and the gauge, respectively.

The carrier 6 and balance chambers 4 and 5 constitute a unitary structure, the distance between the horizontally disposed ledges presented by the sharp-edged orifices 8 and 9 of the balance chambers being fixed, so that the scale of the gauge may at all times furnish a direct measurement in terms of specific gravity of the difference of pressures existing at the levels of the ledges.

In the modified construction shown in Figure 2 the balance chambers are arranged coaxially. 10 denotes a central pipe hanging vertically into the tank or vessel from a suitable support and formed with two apertures 11, 12 at a given distance apart and surrounded by air bells 13, 14 which are preferably of the same capacity and to which lead the pipe connections 2 and 3 from the ends of the differential gauge, the apertures 11, 12 in the central pipe 10 being positioned within the respective air bells 13, 14. The pipe forms the inner walls of annular balance chambers, of which the bells 13, 14, respectively, are the outer walls; and the apertures 11, 12 present at their upper edges horizontally disposed ledges or weirs.

In the further modification shown in Figure 3 the apertures in the central pipe are dispensed with, the lower end of the pipe 10 terminating within the lower air bell 14. The upper bell 13 completely surrounds the central pipe 10 which terminates within the air space of the upper bell, the wall of the upper air bell being provided with an orifice 11 or orifices communicating with the tank contents. With this construction, to replenish the air in the system it suffices to pump air into the lower air bell 14.

The balance chambers may, of course, be fixed instead of being movable vertically.

What I claim and desire to secure by Letters Patent is:

1. For indicating the specific gravity of liquid contained in a tank or other vessel, apparatus comprising two chambers having lateral orifices located in the tank or vessel at a given vertical distance apart, a differential gauge having independent connections to the balance chambers, said gauge being calibrated to furnish a direct reading in terms of specific gravity, and means for clearing said connections and chambers of liquid above the levels of the orifices in the respective chambers.

2. For indicating the specific gravity of liquid contained in a tank or other vessel, apparatus constituted by a unitary structure comprising in effect two balance chambers each provided with a sharp-edged orifice or weir presenting a horizontally disposed ledge, the two ledges being at a fixed distance apart, and a differential gauge having independent connections to the two balance chambers and calibrated to furnish a direct measurement of the differences between the pressures at the said two ledges.

3. An apparatus for indicating the specific gravity of liquids comprising two balance chambers having external orifices, spacing means connected to and holding said chambers with their orifices at a fixed distance apart, suspension means connected to the structure comprised by said chambers and spacing means adapted to lower and raise the same in a body of liquid, a differential gauge, and conduits connecting said balance chambers to said gauge in such a manner that the pressures therein are caused to act oppositely to one another on the gauge, said conduits including flexible connections adapted to permit raising and lowering of the balance chamber structure independently of the gauge.

4. An apparatus for indicating specific gravity comprising a balance chamber structure having two balance chambers spaced apart from one another, and a differential gauge having its external pressure receiving terminals coupled independently to said balance chambers, said balance chamber structure being composed essentially of a pipe and air bells connected to said pipe and spaced apart thereon, the pipe being in communication with the interior of said bells.

5. An apparatus for indicating specific gravity comprising a balance chamber structure having two balance chambers spaced apart from one another, and a differential gauge having its external pressure receiving terminals coupled independently to said balance chambers, said balance chamber structure being composed essentially of a pipe and air bells connected to said pipe and spaced apart thereon, the pipe being in communication with the interior of said bells; in combination with means for introducing air into the lower of said bells, the upper bell having an external orifice opening into the body of liquid in which the structure is submerged.

6. A balance chamber structure for the purpose set forth comprising two balance chambers or air bells and spacing means connected to them and holding them at a given distance apart, there being a conduit leading from a point within the lower bell and opening into the enclosed upper part of the upper bell, and the upper bell having an external orifice, combined with means for introducing air into the lower bell.

7. A balance chamber structure comprising essentially two air bells spaced at a fixed distance apart and including a tubular conduit of larger than capillary capacity opening into the upper part of the upper bell and into the lower bell at a point below its highest part, the upper bell having an external orifice below the upper orifice of said conduit, but being closed at all points above said external orifice against inflow of liquid in which the structure may be submerged, combined with means for delivering air into the upper part of the lower bell.

In testimony whereof I have affixed my signature.

MICHAEL BIRT FIELD.